US006990568B2

(12) United States Patent
Burch

(10) Patent No.: US 6,990,568 B2
(45) Date of Patent: Jan. 24, 2006

(54) RETIRING EARLY-COMPLETION INSTRUCTIONS TO IMPROVE COMPUTER OPERATION THROUGHPUT

(75) Inventor: Carl D. Burch, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 651 days.

(21) Appl. No.: 09/823,403

(22) Filed: Mar. 30, 2001

(65) Prior Publication Data

US 2002/0144094 A1    Oct. 3, 2002

(51) Int. Cl.
 *G06F 15/00* (2006.01)
(52) U.S. Cl. ..................................... 712/218
(58) Field of Classification Search ............... 712/218, 712/219
 See application file for complete search history.

(56) References Cited

U.S. PATENT DOCUMENTS

| | | | |
|---|---|---|---|
| 5,701,442 A | * | 12/1997 | Ronen .......................... 712/37 |
| 5,740,393 A | | 4/1998 | Vidwans et al. |
| 5,748,934 A | | 5/1998 | Lesartre et al. ............. 395/392 |
| 5,799,167 A | | 8/1998 | Lesartre ...................... 395/394 |

(Continued)

OTHER PUBLICATIONS

J. Smith and A. Pleszkun, "Implementing Precise Interrupts In Pipelined Processors," IEEE Trans. On Comp., vol. 37, No. 5, May 1988, pp. 562-573.*

(Continued)

*Primary Examiner*—Eddie Chan
*Assistant Examiner*—Aimee Li
(74) *Attorney, Agent, or Firm*—Tuan V. Ngo

(57) ABSTRACT

The present invention, in various embodiments, provides techniques for retiring instructions that typically complete early as compared to most instructions. In a first embodiment, at each stage of the various processing stages, each instruction capable of early retirement is processed in accordance with that stage. At a particular stage, if the instruction meets the criteria for early retirement, then the instruction is terminated, e.g., "retired," and the system is updated to reflect that the instruction has been terminated. However, if, at that particular stage, the instruction does not meet the criteria for early retirement, then the instruction is processed to the next stage, and it is determined again whether the instruction meets the criteria for early retirement. If the instruction meets the criteria, then the instruction is terminated, or if the instruction does not meet the criteria, then the instruction is processed to the next stage, and so on, until the instruction is retired. In a second embodiment, it is predetermined that early-completion instructions are to be retired at a particular stage. Consequently, all instructions are processed normally and early-completion instructions are retired when they reach that particular stage. For example, early-completion instructions are retired out-of-order after they reach a particular stage in an instruction queue, even though they meet the early-retirement criteria prior to entering the queue. In a third embodiment, early-completion instructions are retired out-of-order when an instruction queue is full. As a result, all instructions are processed normally until the instruction queue is full. At that time, the system is frozen, e.g., all units stop processing instructions. For each instruction in the instruction queue, if the instruction meets the criteria for early retirement, then the instruction is terminated and the system is updated to reflect that the instruction has been terminated. The system is then unfrozen, and all units resume their functions.

17 Claims, 5 Drawing Sheets

U.S. PATENT DOCUMENTS

| | | | | |
|---|---|---|---|---|
| 5,809,275 | A | 9/1998 | Lesartre | 395/392 |
| 5,838,944 | A | 11/1998 | Kipp et al. | 395/394 |
| 5,958,047 | A | 9/1999 | Panwar et al. | |
| 6,216,215 | B1 * | 4/2001 | Palanca et al. | 712/23 |
| 6,539,471 | B2 | 3/2003 | Sheaffer | 712/217 |

OTHER PUBLICATIONS

A. Tannenbaum, "Structured Computer Organization," Prentice-Hall, 1984, pp. 10-12.*

Aho et al., "Compilers Principles, Techniques, and Tools, " Addison-Wesley, 1986, pp. 530-531.*

Thakkar et al., "The Internet Streaming SIMD extensions," Intel Technology Journal, Q2, 1999, p. 3.*

K. M. Lepak, et al., "On The Value Locality of Store Instructions", Jun. 12-14, 2000, 27th Annual International Symposium on Computer Architecture, pp. 1-10.

M. Johnson, "Superscalar Microprocessor Design", 1991, Prentice Hall series in innovative technology, ISBN 0-13-875634-1, pp. 9-30.

Ryan and Thompson, "PowerPC 604 Weighs In," http://www.byte.com/art/9406/sec11/art1.htm, Jun. 1994.

* cited by examiner

RETIRING EARLY-COMPLETION INSTRUCTIONS TO IMPROVE COMPUTER OPERATION THROUGHPUT

FIELD OF THE INVENTION

The present invention relates generally to long-latency computer operations, and, more specifically, to retiring early-completion instructions to improve throughput.

BACKGROUND OF THE INVENTION

Computers commonly execute program instructions in a pipeline in which the system begins executing a second instruction before the first instruction has been completed. In such conditions, several instructions are concurrently in a pipeline, and each instruction is at a different processing stage. In various computer architectures, a great portion of instructions do not have any effect on the program behavior after some stage of the pipeline. Such instructions continue to use system resources and block launching of subsequent instructions even after they could be determined to have no further effect on the overall state of the computation in progress.

The presence of such instructions also degrade system performance, particularly in parallel with long-latency operations, such as in data-cache miss situations or floating-point divide instructions, etc. Data-cache misses occur when the system attempts to use data while the data is still in memory and has not been brought to cache. In that case, the system must fetch the data from memory. Conversely, data-cache hits occur when the data is in the cache ready for use when needed. In one approach, fetching data from memory may take over 100 system clock cycles while fetching the same data from cache takes about three cycles. In one approach, to mitigate performance losses due to data cache misses, the system allows hit-under-miss processing in which the data cache and memory bus system service simultaneously multiple outstanding misses while the processor proceeds with parts of the workload that are data-ready (e.g., as a result of cache hits). Executing data-ready instructions may be considered as out-of-order execution. The data-ready instructions continue through the processor pipeline to the instruction retirement stage, where they must wait behind the missing-data instructions that have not been completed. In effect, completely executed instructions are backed up behind incomplete instructions.

The depths of the pipeline queue holding instructions to be processed out-of-order limit the amount of hit-under-miss processing. In one approach, when the pipeline queues are full, no additional instructions are fetched to the queue until the missing-data instructions at the head of the queue complete. Consequently, no more work can be done past the few cycles it takes for the already executing instructions to finish and pile up in the retirement queue behind the missing-data instructions.

In most approaches, the pipeline queues store at most a few dozen instructions, and these instructions can be finished in less than a third of the system-clock cycles necessary to fetch the missing data to cache. As a result, no work is done for the remaining two-thirds of the cycles while waiting on one missing-data instruction to complete. Meanwhile, many of the already-executed instructions queued behind the missing-data instructions are completely finished. This situation is compounded when the missing data finally returns from memory and instruction retirement resumes. At that point, most or all of the work on the instructions behind the missing-data instruction is done. System throughput is thus limited by the processor's retirement bandwidth, which may be less per cycle than the number of completed instructions ready to retire.

Based on the foregoing, it is clearly desirable that mechanisms be provided to solve the above deficiencies and related problems.

SUMMARY OF THE INVENTION

The present invention, in various embodiments, provides techniques for retiring instructions that typically complete early as compared to most instructions. Early-completion instructions, even though their functions are complete, may impede progress of an instruction queue.

In a first embodiment, at each stage of the various processing stages, each instruction capable of early retirement is processed in accordance with the stage. At a particular stage, if the instruction meets the criteria for early retirement, then the instruction is terminated, e.g., "retired," and the system is updated to reflect that the instruction has been terminated. However, if, at that particular stage, the instruction does not meet the criteria for early retirement, then the instruction is processed to the next stage, and it is determined again whether the instruction meets the criteria for early retirement. If the instruction meets the criteria, then the instruction is terminated, or if the instruction does not meet the criteria, then the instruction is processed to the next stage, and so on, until the instruction is retired.

In a second embodiment, it is predetermined that early-completion instructions are to be retired at a particular stage. Consequently, all instructions are processed normally and early-completion instructions are retired when they reach that particular stage. For example, early-completion instructions are retired out-of-order after they reach a particular stage in an instruction queue, even though they meet the early-retirement criteria prior to entering the queue. Further, when an instruction meets the criteria for early retirement, a signal is associated with the instruction to indicate that the instruction is ready for early retirement.

In a third embodiment, early-completion instructions are retired out-of-order when an instruction queue is full. As a result, all instructions are processed normally until the instruction queue is full. At that time, the system is frozen, e.g., all units stop processing instructions. For each instruction in the instruction queue, if the instruction meets the criteria for early retirement, then the instruction is terminated and the system is updated to reflect that the instruction has been terminated. The system is then unfrozen, and all units resume their functions. In one embodiment, if an instruction meets the early-retirement criteria prior to entering the queue, then a signal associated with the instruction is generated to indicate that the instruction is eligible for early retirement.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE PREFERRED EMBODIMENT

The present invention, in various embodiments, provides techniques for accellerating retirement of early-completion instructions. In one embodiment, the presence of early-completion instructions in an instruction queue can contribute to blocking progress of that queue and thus of the system as a whole. In particular, when the queue is full, no additional instructions can be fetched to the queue until some instructions are retired to provide needed room for the incoming instructions. In the following description, for the purposes of explanation, numerous specific details are set forth in order to provide a thorough understanding of the invention. However, it will be apparent to one skilled in the art that the invention may be practiced without these specific details. In other instances, well-known structures and devices are shown in block diagram form in order to avoid obscuring the invention.

Hardware Overview

Figure 1:
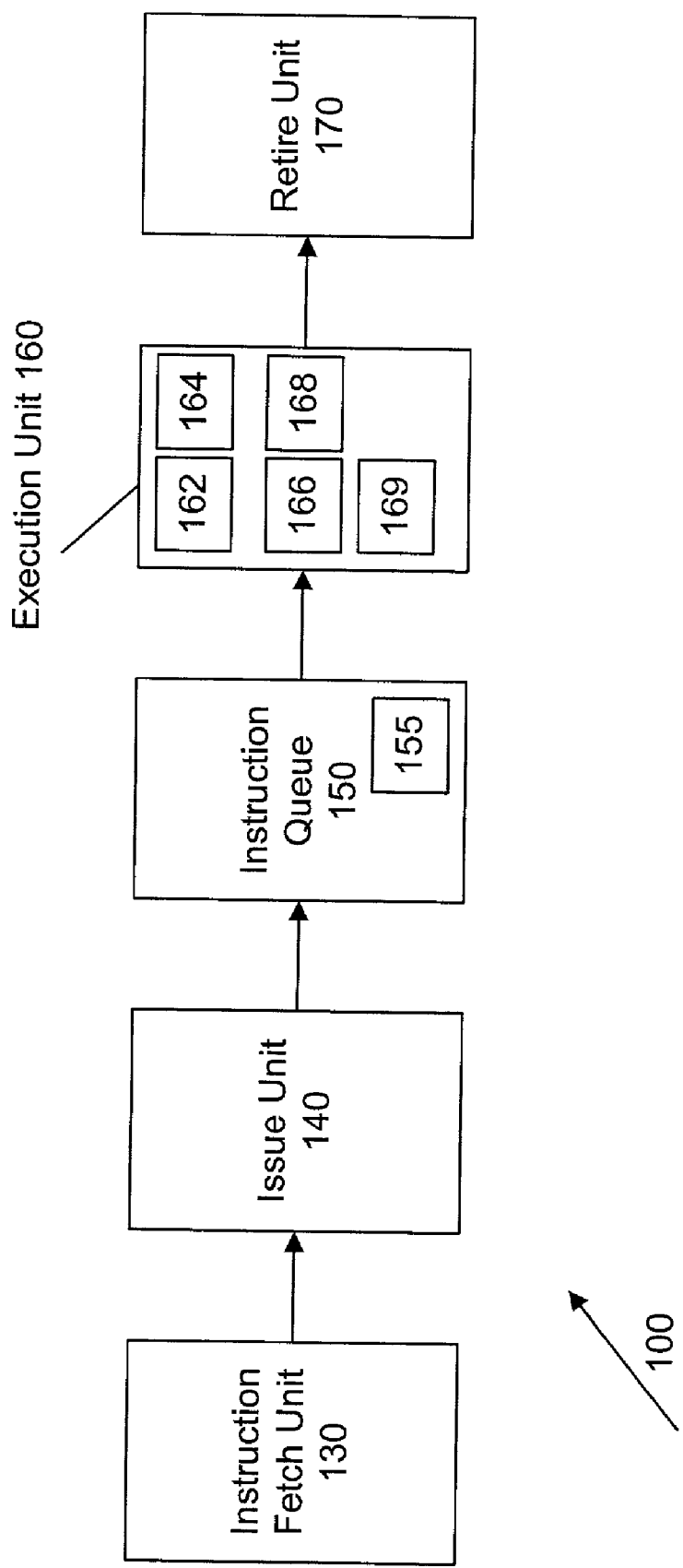
FIG. 1 shows a system upon which embodiments of the invention may be implemented.

FIG. 1 shows an exemplary system 100 upon which embodiments of the invention may be implemented. System 100 includes an instruction fetch unit 130, an issue unit 140, an instruction queue 150, an execution unit 160, and a retire unit 170.

Fetch unit 130 fetches instructions to queue 150. Generally, fetch unit 130 knows whether queue 150 is full so that fetch unit 130 can stop or continue fetching instructions to queue 150. Fetch unit 130 usually receives instructions from an instruction cache or system main memory. In one embodiment, fetch unit 130 includes a "sort" sub-unit for assigning instructions to appropriate instruction queues or to sub units in execution unit 160. In an alternative embodiment, the sort sub-unit is not part of fetch unit 130 and resides outside of fetch unit 130. In one embodiment, the sort sub-unit, based on predecode bits associated with each bundle of instructions, determines in which queue 150 to put each instruction. Further, the sort sub-unit stores instructions to be executed in the order the instructions are fetched by fetch unit 130.

Issue unit 140 ensures inputs to each instruction are ready for assignment to a sub unit in execution unit 160.

For illustration purposes, FIG. 1 shows only one instruction queue 150. However, there may be more than one instruction queue 150, including, for example, an ALU queue and a memory queue. Instruction queue 150, in one embodiment, has an array of 28 slots for 28 instructions, one slot per instruction. Additionally, once instruction queue 150 is full, no additional instruction is fetched into queue 150 until some instructions in queue 150 are retired to provide needed room for the incoming instructions. In one embodiment, queue 150 includes an instruction controller 155 that assigns each instruction to an appropriate sub-execution-unit in execution unit 160. Instruction controller 155 also decides which instructions are to be retired early. An instruction becomes eligible to be launched from queue 150 to execution unit 160 when all dependencies of the instruction are satisfied, e.g., the resources needed by the instructions are available. In most situations, dependencies are satisfied by other instructions launching, retiring, or passing a "proceed" indicator.

Execution unit 160 executes instructions launched from queue 150. In one embodiment, execution unit 160 includes various sub units such as load/store address 162, integer ALUs 164, shift/merge 166, multiply/accumulate 168, divide/square root 169, etc. Load/store address sub-unit 162 loads and stores the address and the data and instruction to, for example, a memory buffer from which the instruction may be executed. Integer ALUs sub-unit 164 executes instructions involving integers such as ADD, SUBSTRACT, etc. Shift/merge sub-unit 166 shifts and/or merges data in various instructions. In one embodiment, a NO-OP (no-operation) instruction is executed in unit integer ALU 164, a prefetch instruction is executed in unit load/store 162. Once an instruction has successfully executed, it is eligible to be retired.

Retire unit 170 controls the retirement of instructions. After retirement, the slot for the retired instruction is cleared so that it is ready to accept a new instruction. In one embodiment, retirement includes updating the architectural state of the system, copying the rename register to other registers (general registers, floating-point registers, etc.), storing the results of the instructions in memory or in the processor's registers, etc. In one embodiment, the architectural state comprises the most recently completed and pending assignment to each register, relative to the end of the known instruction sequence, regardless of which instructions have been issued or completed. This is the state that should be accessed by an instruction following a particular sequence for correct program operation. Retire unit 170 keeps track of where the next oldest instruction is coming from. In one embodiment, retire unit 170, after retiring early-completion instructions, updates the architecture registers to a state corresponding to the state as if the early-completion instructions are executed in-order so that the system can recognize that these early-completion instructions are completely terminated. Retire unit 170 may also commit temporary results in the performance core of the system executing the instruction to the architectural state. In some situations, retire unit 170 may not receive early-completion instructions because these instructions are terminated without entering queue 150, execution unit 160, or retire unit 170.

Generally, each instruction is processed through the various stages of units 130, 140, 150, 160, and 170 in a sequence defined by the program. That is, the instruction is executed in order. Further, system 100 uses a pipeline technique in which an instruction is pipelined through fetch unit 130, issue unit 140, instruction queue 150, execution unit 160, and retire unit 170. Most instructions are processed through the pipeline cycle, and after being processed in retire unit 170, an instruction is retired in order.

In one embodiment, system 100 does not include instruction queue 150. After the instructions propagate to, and are executed in, execution unit 160, they queue in retire unit 170 so that the system architectural state can be updated.

Early Retirement Instructions

In accordance with the techniques disclosed herein, if an instruction meets the early-retirement criteria, then the instruction is eligible for early retirement or retired out of order of the normal sequence driven by the program. In one embodiment, the criteria are met when the instruction is executed to a point that continued execution of the instruction does not change the system architectural state or does not have any further effect on the program behavior. Early-completion instructions are those that complete their functions without necessarily completing their full pipeline cycle or updating the architectural state. Early-completion instructions do not necessarily flow through all units 130, 140, 150, 160, and 170, but may be terminated while being in one of the units 130, 140, 150, 160, and 170. Consequently, in accordance with the techniques disclosed herein, early-completion instructions are retired out-of-order. In one embodiment, each early-completion instruction includes a tag, such as a bit, to indicate that the instruction is an early-completion instruction.

Type of Early-completion Instructions

System throughput can be improved by using the techniques disclosed herein on at least NO-OP, prefetch, and branch instructions, or any other type of instruction determined to be nullified or predicated-false. However, the invention is not limited to these types of instructions. Techniques of the invention are applicable to different instructions meeting the criteria to be retired early. Exemplary criteria for early retirement include (1) the current instance of the instructions will not update the architectural state other than the program counter or (2) the update can be determined to be redundant, e.g., a load of the same value already in a register.

In one embodiment, NO-OP instructions are both explicit and implicit. An explicit NO-OP instruction includes an op-code that does nothing, i.e., except taking up space. In one embodiment, NO-OP instructions include a logical "OR" of a register R0 with a register RO, loading a value 0 from register R0 into register R0 (e.g., instruction LD0), etc. Further, register R0 is hardwired to a logical 0, and, consequently, writing any value to a register R0 is a NO-OP because such writing has no program effect. In one embodiment, evaluating the op-code and the register target of an instruction provides information to determine whether an instruction is a NO-OP instruction.

Prefetch instructions, in one embodiment, are instructions that load data from a particular location into a data cache so that the data is ready to be used by another instruction. After the data has been loaded, the instruction has no program effect and may be treated as a NO-OP instruction. In one embodiment, once prefetch instructions are issued as a bus transaction to memory, their function is complete, e.g., they have no further program effect. In this example, the main program effect is memory operation, and once the data is fetched from memory, the function of the data prefetch instruction is complete. As another example, a prefetch instruction loading data from memory to cache has no program effect if the data is already in the cache when an instruction using the data is executed.

Branch instructions, after some processing stages, meet the early-retirement criteria, particularly once a branch instruction condition is known. Further execution of an instruction branch is then predictable, i.e., whether a branch condition is satisfied and thus the instructions for that branch target are processed. Similarly, if a branch condition is not satisfied, then this branch target of the instruction is not processed. In one embodiment, fetch unit 130 predicts processing of a branch instruction, and execution unit 160 confirms or rejects the prediction of fetch unit 130. Execution unit 160 thus can determine whether the function of a branch instruction is complete.

Nullified or predicated-false instructions are those rendered inoperative or invalid by another instruction, usually based on the execution result of that instruction. In one embodiment, as prescribed by the Precision Architecture industry standard, an instruction is nullified, if at all, by an immediately preceding instruction in the program order. A branch instruction may be considered a nullified instruction, e.g., when a branch is not executed due to the execution of the other branch. In another embodiment, as prescribed by the Itanium family architecture, an instruction's execution may be disabled by one or more of its predicate bits having been previously set to false.

Techniques for Retiring Early-completion Instructions

First Embodiment

Figure 2:
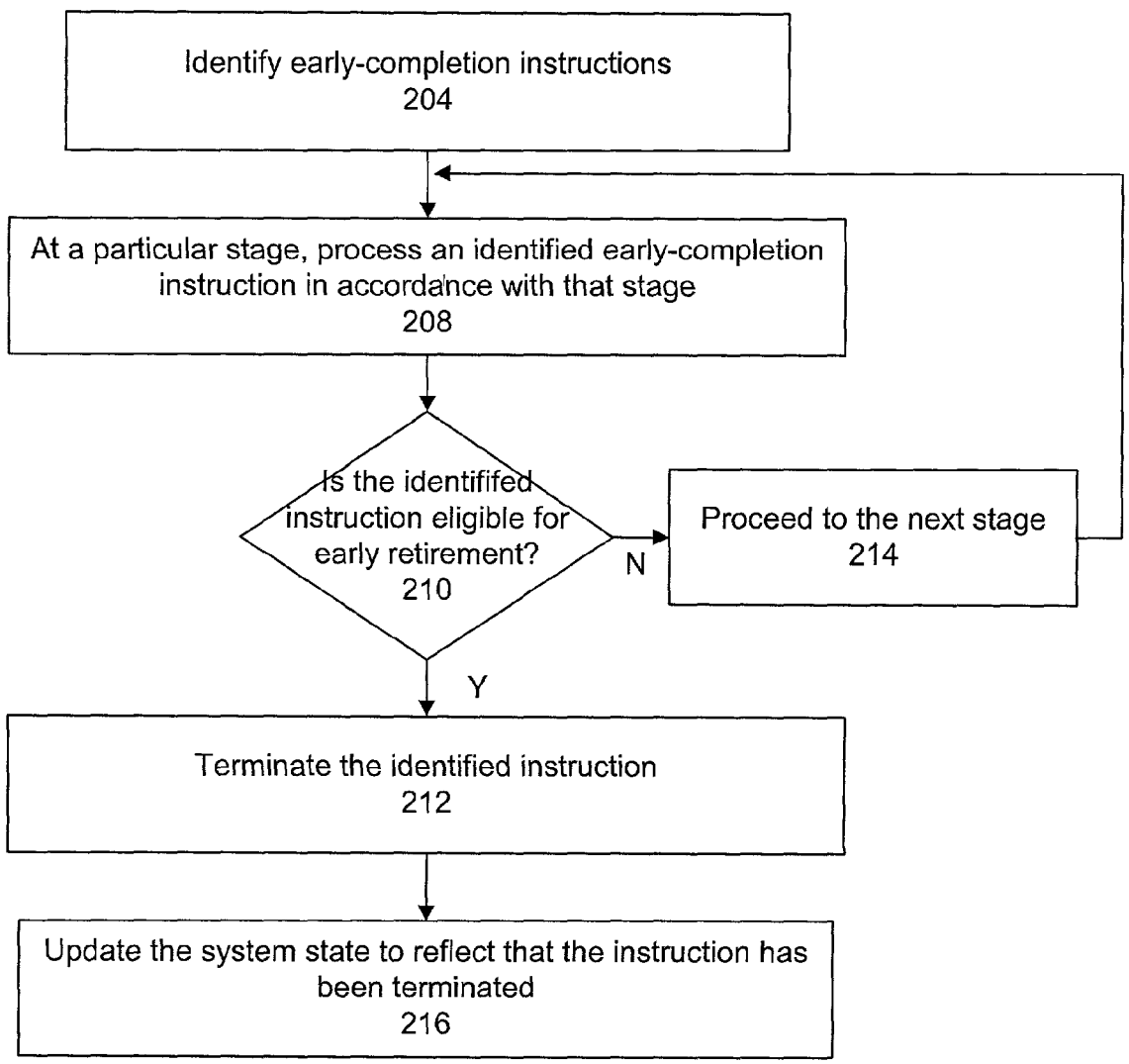
FIG. 2 is a flowchart for a method implementing a first embodiment of the invention.

FIG. 2 is a flowchart illustrating a method for implementing a first embodiment of the invention. In this embodiment, instructions are normally processed through one or more of the various processing stages. In step 204, each instruction capable of early completion is identified. At each stage of the various stages, each identified instruction, in step 208, is processed in accordance with that particular stage. In step 210, it is determined whether an early-completion instruction is eligible for early retirement. That is, whether the instruction meets all criteria for early retirement. If it is, then, in step 212, the instruction is terminated, and, in step 216, the system state is updated reflecting that the instruction has been completed. However, if the instruction is not eligible for early retirement in a particular stage, then the instruction, in step 214, proceeds to the next stage, and the instruction is processed in accordance with step 208. That is, if the instruction meets the early-retirement criteria, then the instruction is terminated; otherwise, the instruction proceeds to the next stage, etc.

NO-OP instructions can greatly benefit from this embodiment of the invention because NO-OP instructions can be terminated very early in the process. In one embodiment, when a NO-OP instruction is brought into the instruction cache, the instruction cache decodes and provides information to determine whether an instruction is a NO-OP instruction. If the instruction is a NO-OP, then the instruction can be terminated immediately. Alternatively, when the instruction and the information indicating that the instruction is a NO-OP is passed to other units, other units can terminate the instruction. In one embodiment, fetch unit 130 terminates NO-OP instructions by simply ignoring that instruction (beyond the necessary bookkeeping to account for its effect on the program counter). In these conditions, NO-OP instructions do not enter queue 150, execution unit 160, or retire unit 170.

Second Embodiment

Figure 3:
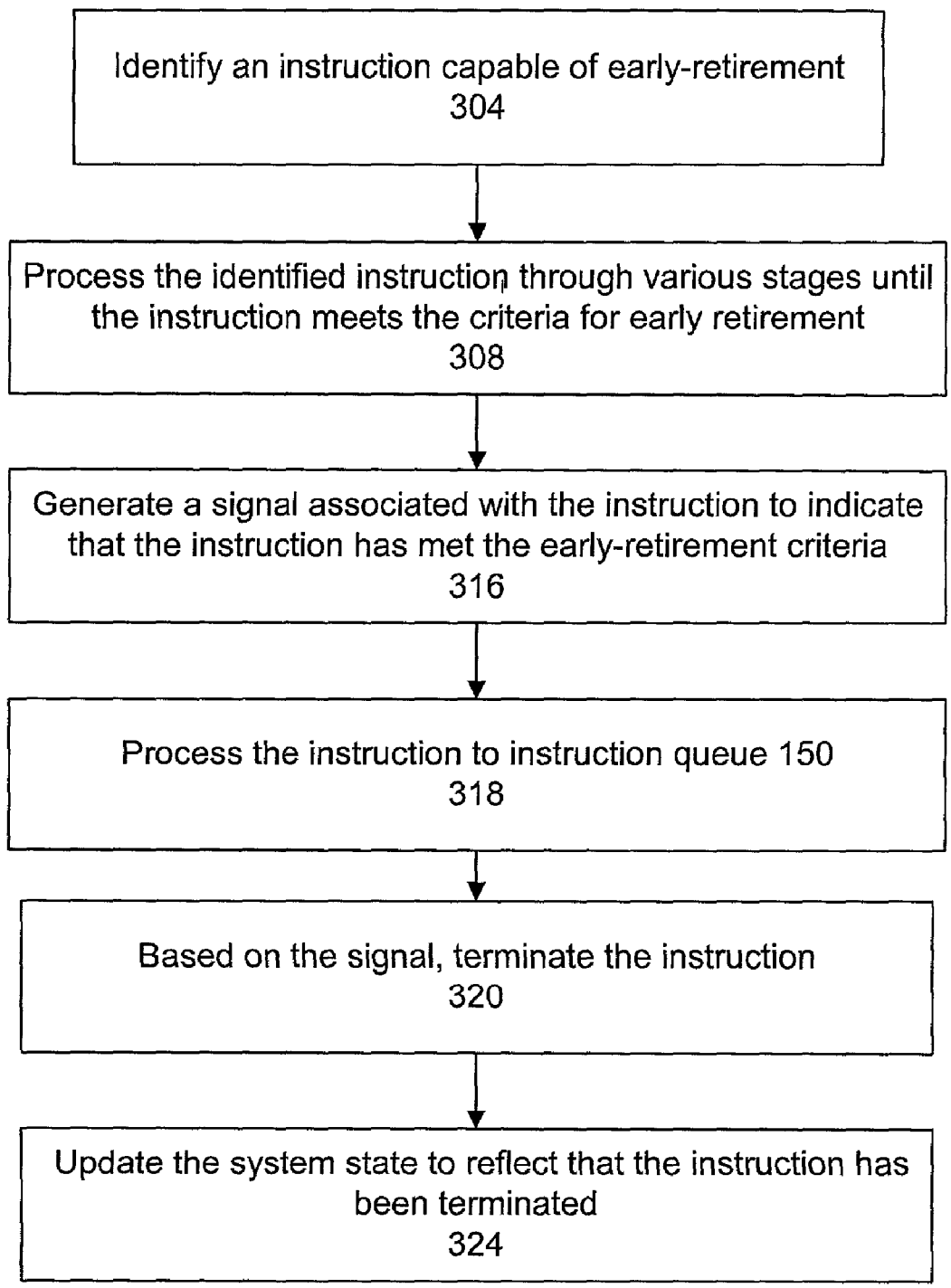
FIG. 3 is a flowchart for a method implementing a second embodiment of the invention.

FIG. 3 is a flowchart illustrating a method implementing a second embodiment of the invention. In step 304, an instruction capable of early retirement is identified. In step 308, the identified instruction is processed to a stage where the instruction meets the early-retirement criteria. It may take one or more stages before an instruction can be determined to meet the early-retirement criteria. After the instruction meets the criteria, a signal associated with the instruction is generated in step 316 to indicate that the instruction has met the criteria for early retirement. In one embodiment the signal is sent to an early-retirement unit informing such unit that the instruction is eligible for early retirement. In step 318, the instruction is processed to instruction queue 150. In step 320, based on the early-retirement signal, the instruction is terminated, e.g., retired early or out-of-order. In one embodiment, the early-retirement unit arranges such termination, and instruction controller 155 performs the functions of the early-retirement unit. Further, when instruction controller 155 receives the early-completion signal, instruction controller 155 discards the instruction to terminate it and updates its internal state to account for the pipeline "bubble" that results. After the instruction is retired out-of-order, the system is updated in step 324 to reflect that the early-completion instruction has been terminated.

This second embodiment is beneficial because early-completion instructions are retired out-of-order without having to wait in instruction queue 150 to be retired in-order as in other approaches. Further, this second embodiment, having a centralized early-retirement unit to retire early-completion instructions, does not require early-retirement units in each of the pipelined units. Consequently, this second embodiment can be less expensive than other approaches.

Third Embodinent

Figure 4:
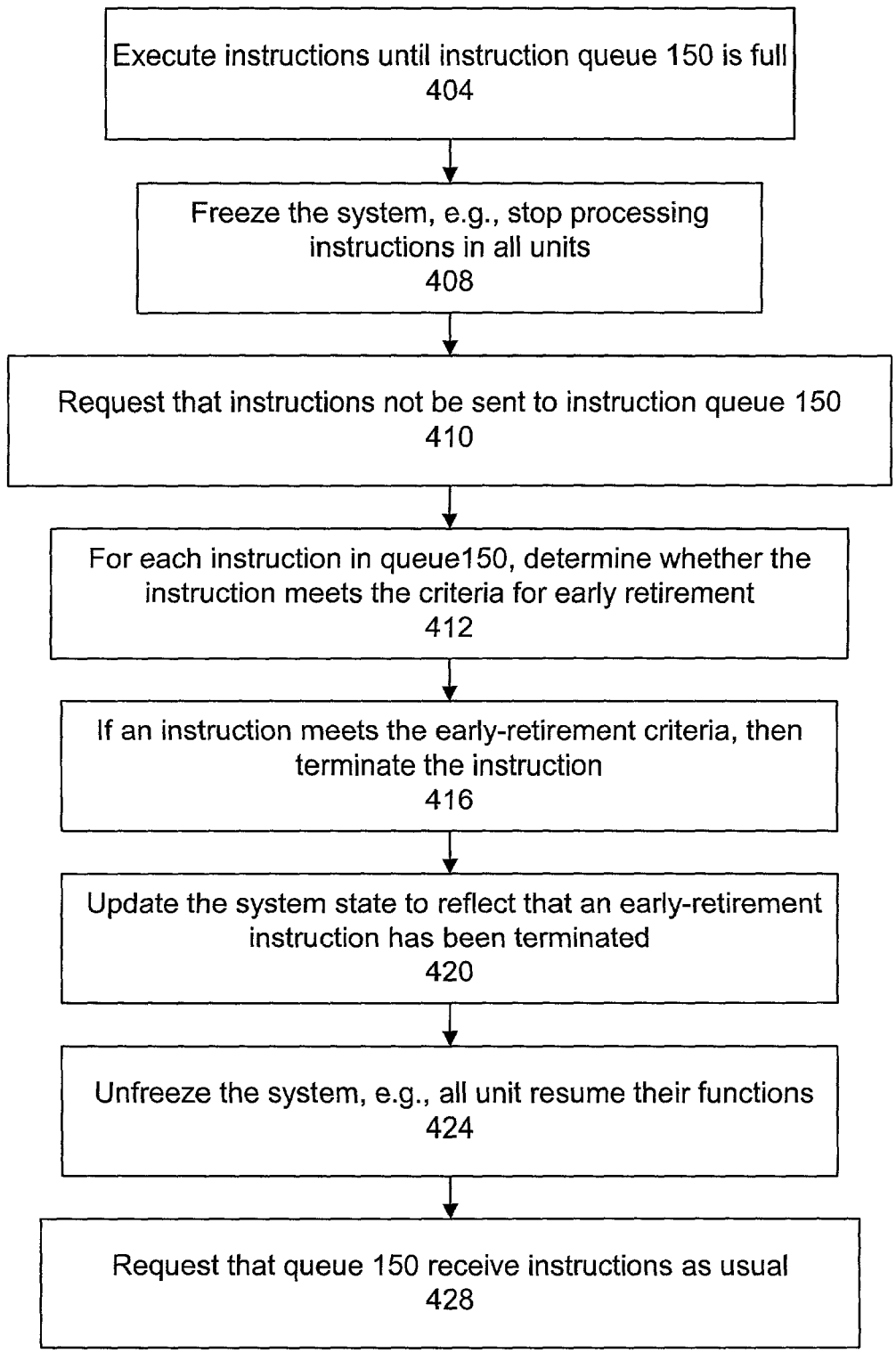
FIG. 4 is a flowchart for a method implementing a third embodiment of the invention.

FIG. 4 is a flowchart illustrating a method implementing a third embodiment of the invention. In step 404, instructions are executed normally, i.e., the instructions are processed through appropriate stages in units 130, 140, 150, etc., and up to a point where instruction queue 150 is full. In step 408, the system executing the program is frozen. Alternatively, all units stop processing instructions. In step 410, instruction controller 155 sends a signal to fetch unit 130 indicating that queue 150 is full and requests that fetch unit 130 stop fetching instructions to queue 150. In step 412, for each instruction in queue 150, it is determined whether the instruction meets the criteria for early retirement. In one embodiment, execution unit 160 indicates whether the criteria are met. In step 416, each instruction meeting the early-retirement criteria is terminated, e.g., removed from queue 150. As in other embodiments, there are various ways to remove an instruction from queue 150. In one embodiment, omitting the instruction from further processing terminates it, or, in effect, removes it from queue 150. In step 420, the system state is updated to reflect that an early-retirement instruction has been completely terminated. In step 424, the system is unfrozen, e.g., all units resume their functions. In step 428, a "ready" signal is sent to fetch unit 130 indicating that queue 150 is ready to receive additional instructions for fetch unit 130 to take actions accordingly. In one embodiment, instruction controller 155 unfreezes the system and sends the ready signal to fetch unit 130.

Depending on the embodiment, updating the system state may include changing system data structure, removing traces related to the instructions, reverting the system to a consistent state as if the early-retirement instruction does not exist, etc.

Benefit of the Invention

In one embodiment, there are about 28 instructions in instruction queue 150, and in many instances about 6–7 instructions are subject to early completion. Retiring early these early-completion instructions can double the speed of the system. Early retiring early-completion instructions also increases the system capacity without enlarging queue 150, and increases retirement bandwidth because early-completion instructions not only take up instruction queue space but also take up retirement bandwidth.

Computer System Overview

Figure 5:
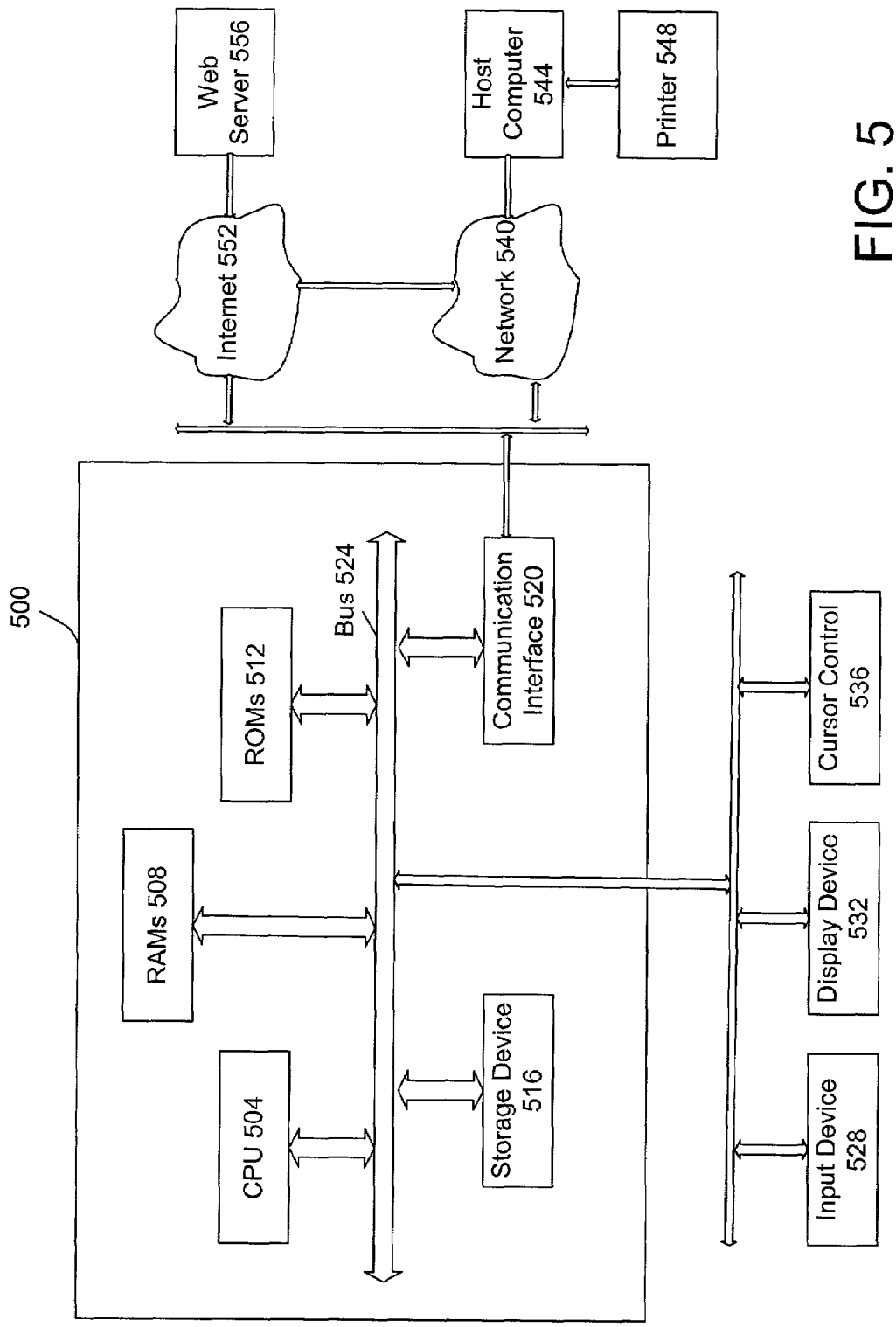
FIG. 5 is a block diagram of a computer upon which embodiments of the invention may be implemented.

FIG. 5 is a block diagram showing a computer system 500 upon which an embodiment of the invention may be implemented. For example, computer system 500 may be implemented to include system 100. In one embodiment, computer system 500 includes a processor 504, random access memories (RAMs) 508, read-only memories (ROMs) 512, a storage device 516, and a communication interface 520, all of which are connected to a bus 524.

Processor 504 controls logic, processes information, and coordinates activities within computer system 500. In one embodiment, processor 504 executes instructions stored in RAMs 508 and ROMs 512, by, for example, coordinating the movement of data from input device 528 to display device 532.

RAMs 508, usually being referred to as main memory, temporarily store information and instructions to be executed by processor 504. Information in RAMs 508 may be obtained from input device 528 or generated by processor 504 as part of the algorithmic processes required by the instructions that are executed by processor 504.

ROMs 512 store information and instructions that, once written in a ROM chip, are read-only and are not modified or removed. In one embodiment, ROMs 512 store commands for configurations and initial operations of computer system 500.

Storage device 516, such as floppy disks, disk drives, or tape drives, durably stores information for used by computer system 500.

Communication interface 520 enables computer system 500 to interface with other computers or devices. Communication interface 520 may be, for example, a modem, an integrated services digital network (ISDN) card, a local area network (LAN) port, etc. Those skilled in the art will recognize that modems or ISDN cards provide data communications via telephone lines while a LAN port provides data communications via a LAN. Communication interface 520 may also allow wireless communications.

Bus 524 can be any communication mechanism for communicating information for use by computer system 500. In the example of FIG. 5, bus 524 is a media for transferring data between processor 504, RAMs 508, ROMs 512, storage device 516, communication interface 520, etc.

Computer system 500 is typically coupled to an input device 528, a display device 532, and a cursor control 536. Input device 528, such as a keyboard including alphanumeric and other keys, communicates information and commands to processor 504. Display device 532, such as a cathode ray tube (CRT), displays information to users of computer system 500. Cursor control 536, such as a mouse, a trackball, or cursor direction keys, communicates direction information and commands to processor 504 and controls cursor movement on display device 532.

Computer system 500 may communicate with other computers or devices through one or more networks. For example, computer system 500, using communication interface 520, communicates through a network 540 to another computer 544 connected to a printer 548, or through the world wide web 552 to a server 556. The world wide web 552 is commonly referred to as the "Internet." Alternatively, computer system 500 may access the Internet 552 via network 540.

Computer system 500 maybe used to implement the techniques described above. In various embodiments, processor 504 performs the steps of the techniques by executing instructions brought to RAMs 508. In alternative embodiments, hard-wired circuitry may be used in place of or in combination with software instructions to implement the described techniques. Consequently, embodiments of the invention are not limited to any one or a combination of software, hardware, or circuitry.

Instructions executed by processor 504 may be stored in and carried through one or more computer-readable media, which refer to any medium from which a computer reads information. Computer-readable media may be, for example, storage media such as a floppy disk, a hard disk, a zip-drive cartridge, a magnetic tape, or any other magnetic medium, a CD-ROM, a CD-RAM, a DVD-ROM, a DVD-RAM, or any other optical medium, paper-tape, punchcards, or any other physical medium having patterns of holes, a RAM, a ROM, an EPROM, or any other memory chip or cartridge. Computer-readable media may also be coaxial cables, copper wire, fiber optics, acoustic, or light waves, etc. As an example, the instructions to be executed by processor 504 are in the form of one or more software programs and are initially stored in a CD-ROM being interfaced with computer system 500 via bus 524. Computer system 500 loads these instructions in RAMs 508, executes some instructions, and sends some instructions via communication interface 520, a modem, and a telephone line to a network, e.g. network 540, the Internet 552, etc. A remote computer, receiving data through a network cable, executes the received instructions and sends the data to computer system 500 to be stored in storage device 516.

In the foregoing specification, techniques of the invention have been described with reference to specific embodiments thereof. However, it will be evident that various modifications and changes may be made thereto without departing from the broader spirit and scope of the invention. For example, system 100 may not include all units shown in FIG. 1 or may include additional units not shown in that FIG. 1, and each unit may include one or more processing stages. Accordingly, the specification and drawings are to be regarded as illustrative rather than as restrictive.

What is claimed is:

1. A method for retiring a first instruction processed through various processing stages, comprising the steps of:
   Processing a second instruction different from the first instruction;
   Processing the first instruction until the first instruction meets the criteria for early retirement;
   Indicating that the first instruction has met the early-retirement criteria;
   Processing the first instruction to a desirable stage, and at which, based on an indication that the first instruction has met the early-retirement criteria, terminating the first instruction out of order of a program running the first instruction; and
   Updating a state of a system processing the first instruction to reflect that the first instruction has been terminated;
   Wherein the early retirement criteria is met when processing the second instruction results in continued processing of the first instruction not changing an architectural state of the system processing the first instruction, and, at the time of termination, the first instruction has completed its function without completing its full pipeline.

2. The method of claim 1 wherein the step of indicating comprises generating a signal associated with the first instruction.

3. The method of claim 2 further comprises the steps of:
   sending the signal to an early-retirement unit; and
   the early-retirement unit arranging for the first instruction to be terminated.

4. The method of claim 1 wherein the various processing stages include one or more of the following stages: fetching, issuing, sorting, executing, queuing, and retiring.

5. The method of claim 1 wherein an instruction capable of early retirement includes an identification tag for identifying whether the instruction is capable of early retirement.

6. The method of claim 1 wherein processing the second instruction comprises executing a branch condition of a branch instruction.

7. The method of claim 6 wherein terminating the first instruction includes discarding execution of a branch of the branch instruction.

8. The method of claim 1 wherein processing the second instruction comprises loading a register with a value that the register already contains.

9. A computer-readable storaae medium storina embodying-instructions that cause a computer to perform a method for retiring a first instruction processed through various processing stages, the method comprising the steps of:
   Processing a second instruction different from the first instruction;
   Processing the first instruction until the first instruction meets the criteria for early retirement;
   Indicating that the first instruction has met the early-retirement criteria;
   Processing the first instruction to a desirable stage, and at which, based on an indication that the first instruction has met the early-retirement criteria, terminating the first instruction out of order of a program running the first instruction; and
   Updating a state of a system processing the first instruction to reflect that the first instruction has been terminated;
   Wherein the early-retirement criteria is met when processing the instruction results in continued processing of the first instruction not changing an architectural state of the system processing the first instruction, and, at the time of termination, the first instruction has completed its function without completing its full pipeline.

10. The computer-readable storaae medium of claim 9 wherein the step of indicating comprises the step of generating a signal associated with the first instruction.

11. The computer-readable storage medium of claim 10 wherein the method further comprises the steps of:
   sending the signal to an early-retirement unit; and
   the early-retirement unit arranging for the first instruction to be terminated.

12. The computer-readable storage medium of claim 9 wherein the various processing stages include one or more of the following stages: fetching, issuing, sorting, executing, queuing, and retiring.

13. The computer-readable storage medium of claim 9 wherein an instruction capable of early retirement includes an identification tag for identifying whether the instruction is capable of early retirement.

14. A system for retiring a first instruction processed through various processing stages, comprising:
   A first processing means for processing a second instruction different from the first instruction;
   A second processing means for processing the first instruction until the first instruction meets the criteria for early retirement;
   A third processing means for processing the first instruction to a desirable stage, and at which, based on an indication that the first instruction has met the early-retirement criteria, terminating the first instruction out of order of a program running the first instruction; and
   An updating means for updating a state of the system to reflect that the first instruction has been terminated;

wherein the early-retirement criteria is met when processing the instruction results in continued processing of the first instruction not changing an architectural state of the system processing the first instruction, and, at the time of termination, the first instruction has completed its function without completing its full pipeline.

15. A method for retiring an instruction processed through various processing stages, comprising the steps of:

Processing the instruction until the instruction meets criteria for early retirement;

Indicating that the instruction has met the early-retirement criteria;

Processing the instruction to a desirable stage, and at which, based on an indication that the instruction has met the early-retirement criteria, terminating the instruction out of order of a program running the instruction; and Updating a state of a system processing the instruction to reflect that the instruction has been terminated;

Wherein the early-retirement criteria is met when the instruction is identified as Performing a logical OR of a register with the same register, writing a value 0 from a register into the same register, or writing a value to a register hardwired to a predetermined value, and At the time of termination, the instruction has completed its function without completing its full pipeline.

16. The method of claim 15 further comprises one or a combination of the following steps to determine whether the early-retirement criteria is met:

evaluating an op-code of the instruction; and evaluating a register target of the instruction.

17. A method for retiring early a NO-OP instruction that is scheduled to be processed through various processing stages, the method comprising the steps of:

Evaluating an op-code of an instruction to determine whether the instruction is the NO-OP instruction, and, if so, using a tag to indicate that the NO-OP instruction has met early-retirement criteria;

Processing the NO-OP instruction to a desirable stage, and at which, based on the indication that the NO-OP instruction has met the early-retirement criteria, terminating the NO-OP instruction out of order of a program running the NO-OP instruction; thereby skipping processing the NO-OP instruction in at least one of the processing stages; and Updating a state of a system processing the NO-OP instruction to reflect that the NO-OP instruction has been terminated; and Wherein the early-retirement criteria is met when, at the time of termination, the NO-OP instruction has completed its function without completing its full pipeline.

* * * * *

UNITED STATES PATENT AND TRADEMARK OFFICE
CERTIFICATE OF CORRECTION

PATENT NO.       : 6,990,568 B2
APPLICATION NO.  : 09/823403
DATED            : January 24, 2006
INVENTOR(S)      : Carl D. Burch It is certified that error appears in the above-identified patent and that said Letters Patent is hereby corrected as shown below:

In column 5, line 30, delete "RO" and insert -- R0 --, therefor.

In column 9, line 36, in Claim 1, delete "Processing" and insert -- processing --, therefor.

In column 9, line 38, in Claim 1, delete "Processing" and insert -- processing --, therefor.

In column 9, line 40, in Claim 1, delete "Indicating" and insert -- indicating --, therefor.

In column 9, line 42, in Claim 1, delete "Processing" and insert -- processing --, therefor.

In column 9, line 48, in Claim 1, delete "Updating" and insert -- updating --, therefor.

In column 9, line 51, in Claim 1, delete "Wherein" and insert -- wherein --, therefor.

In column 10, line 13, in Claim 9, delete "storaae" and insert -- storage --, therefor.

In column 10, lines 13-14, in Claim 9, delete "storina embodying-" and insert -- storing --, therefor.

In column 10, line 17, in Claim 9, delete "Processing" and insert -- processing --, therefor.

In column 10, line 19, in Claim 9, delete "Processing" and insert -- processing --, therefor.

In column 10, line 21, in Claim 9, delete "Indicating" and insert -- indicating --, therefor.

UNITED STATES PATENT AND TRADEMARK OFFICE
CERTIFICATE OF CORRECTION

PATENT NO.       : 6,990,568 B2
APPLICATION NO.  : 09/823403
DATED            : January 24, 2006
INVENTOR(S)      : Carl D. Burch It is certified that error appears in the above-identified patent and that said Letters Patent is hereby corrected as shown below:

In column 10, line 23, in Claim 9, delete "Processing" and insert -- processing --, therefor.

In column 10, line 28, in Claim 9, delete "Updating" and insert -- updating --, therefor.

In column 10, line 31, in Claim 9, delete "Wherein" and insert -- wherein --, therefor.

In column 10, line 38, in Claim 10, delete "storaae" and insert -- storage --, therefor.

In column 10, line 56, in Claim 14, delete "A" and insert -- a --, therefor.

In column 10, line 58, in Claim 14, delete "A" and insert -- a --, therefor.

In column 10, line 61, in Claim 14, delete "A" and insert -- a --, therefor.

In column 10, line 66, in Claim 14, delete "An" and insert -- an --, therefor.

In column 11, line 1, in Claim 14, delete "Wherein" and insert -- wherein --, therefor.

In column 11, line 10, in Claim 15, delete "Processing" and insert -- processing --, therefor.

In column 11, line 12, in Claim 15, delete "Indicating" and insert -- indicating --, therefor.

In column 11, line 14, in Claim 15, delete "Processing" and insert -- processing --, therefor.

In column 11, line 19, in Claim 15, delete "Updating" and insert -- updating --, therefor.

In column 11, line 21, in Claim 15, delete "Wherein" and insert -- wherein --, therefor.

In column 11, line 23, in Claim 15, delete "Performing" and insert -- performing --, therefor.

UNITED STATES PATENT AND TRADEMARK OFFICE
CERTIFICATE OF CORRECTION

PATENT NO. : 6,990,568 B2
APPLICATION NO. : 09/823403
DATED : January 24, 2006
INVENTOR(S) : Carl D. Burch It is certified that error appears in the above-identified patent and that said Letters Patent is hereby corrected as shown below:

In column 11, line 27, in Claim 15, delete "At" and insert -- at --, therefor.

In column 12, line 10, in Claim 17, delete "Evaluating" and insert -- evaluating --, therefor.

In column 12, line 14, in Claim 17, delete "Processing" and insert -- processing --, therefor.

In column 12, line 21, in Claim 17, delete "Updating" and insert -- updating --, therefor.

In column 12, line 24, in Claim 17, delete "Wherein" and insert -- wherein --, therefor.

Signed and Sealed this

Eleventh Day of August, 2009

David J. Kappos
*Director of the United States Patent and Trademark Office*